Patented Oct. 8, 1935

2,016,471

UNITED STATES PATENT OFFICE 2,016,471

STABILIZING SILVER HALIDE EMULSIONS

Gustav Wilmanns, Wolfen Kreis Bitterfeld, and Johannes Brunken, Dessau-in-Anhalt, Germany, assignors to Agfa Ansco Corporation, Binghamton, N. Y., a corporation of New York No Drawing. Application March 2, 1934, Serial No. 713,773. In Germany March 10, 1933

8 Claims. (Cl. 95—7)

Our present invention relates to stabilizing a silver halide emulsion.

One of its objects is a process of increasing the stability of photographic silver halide emulsions. Another object are the stabilized emulsions. Further objects will be seen from the detailed specification following hereafter.

The sensitivity of photographic silver halide emulsions may be increased by incorporating in them trimethylamine and triethylamine. By this treatment, however, the stability of the layers is impaired by an increased tendency of the layers to fogging in storing.

This invention is based on the surprising and unexpected discovery that the addition of secondary or tertiary higher aliphatic amines increases the stability of photographic emulsions. Whereas di- and tripropylamine and tributylamine have already an appreciable stabilizing action, that of amines of the amyl series, for instance, diisoamylamine, triisoamylamine, trinormalamylamine, is very remarkable. The secondary and tertiary amines of the hexyl, heptyl, octyl and nonyl series, too, increase the stability. However, the solubility in water of the amines decreases with the extension of the carbon chain so that the amines are no longer capable of displaying their full efficiency in the emulsion. Therefore, the amines suitable for the purpose of the invention must have a sufficiently high solubility in water. This is the case with amines of the amyl, hexyl, heptyl and octyl series. Furthermore, there have proved suitable the aliphatic secondary and tertiary amines containing in the aliphatic radical an aromatic substituent, for instance, dibenzylamine and tribenzyl amine. According to this invention the secondary or tertiary amines may also have dissimilar alkyl groups. Thus, for instance, propyl amylhexylamine and amylhexylamine may be used with success. As compared with the secondary or tertiary aromatic amines the secondary and tertiary aliphatic amines have the advantage of a better solubility in water. The novel stabilizers may be applied with success to non-sensitized and more particularly to optically sinsitized, as well as for hypersensitized emulsions. Particularly when used for sensitized emulsions they have the advantage of producing no alteration of the sensitivity, whereas for instance stabilization with potassium bromide in the case of certain sensitizing dyestuffs causes the sensibility to be more or less decreased. The secondary or tertiary aliphatic amines may also be used in admixture with other stabilizers, for instance, potassium bromide and substances, as they are described in U. S. Patents Nos. 1,696,830, 1,758,576, 1,758,577 and in the co-pending application Ser. No. 611,756, filed May 16, 1932 by Zehlke. They are applicable for emulsions prepared by using gelatin, collodion, agar, polyglucuronic acid or another protective colloid as a binding agent. They are preferably applied in a solvent miscible with water, for instance acetone, alcohol or methanol, or in the form of an aqueous solution. The quantity of substance employed amounts to 0.1 to 3 grams on 100 grams of gelatin.

The stabilizers may be applied in various manners:

(1) They are incorporated in the starting materials used for the manufacture of the emulsion or in the emulsion itself, either during its preparation or during an after-treatment or they are added to the casting solution.

(2) They are incorporated by immersing the finished layer in a suitable bath containing the amine or in the supersensitization of the finished photographic layer by means of baths containing alkali and silver to which the amine has been added.

(3) They are incorporated in the support, for instance, a celluloid support, as an addition to the solution from which the support is cast or to the solution from which the preparation layer is made.

(4) The stabilizer is incorporated in a special sublayer, intermediate layer or coating and thus brought into contact with the emulsion.

The following examples illustrate the invention:

*Example 1.*—1 kilo of silver halide emulsion containing 90 to 100 grams of gelatin and 50 to 100 grams of silver halide is mixed, prior to casting, with 50 to 100 cc. of a solution of 2 per cent. strength of tri-normal-amylamine or di-iso-amylamine. The plates coated with this emulsion are stored under the same conditions as plates coated with the corresponding emulsion that has not received an addition of amine. From the beginning of this comparative test the plates coated with the emulsion containing the addition of amine show a better clearness; after some time the difference of clearness becomes more marked.

*Example 2.*—1 kilo of silver halide emulsion containing 90 to 100 grams of gelatin and 50 to 100 grams of silver halide ready for being cast is mixed with 50 to 100 cc. of a solution of dibenzylamine of 2 per cent strength.

What we claim is:

1. A method of stabilizing a silver halide emulsion which comprises incorporating in said emulsion a compound selected from the group consisting of secondary and tertiary amines having bound to the nitrogen atom methyl groups substituted by a radical selected from the group consisting of radicals of aliphatic hydrocarbons containing not less than 2 carbon atoms and not more than 7 carbon atoms, and aromatic radicals of the benzene series.

2. A method of stabilizing a silver halide emulsion which comprises incorporating in said emulsion di-iso-amylamine.

3. A method of stabilizing a silver halide emulsion which comprises incorporating in said emulsion di-isoamylamine.

4. A method of stabilizing a silver halide emulsion which comprises incorporating in said emulsion dibenzylamine.

5. A stabilized silver halide emulsion containing a compound selected from the group consisting of secondary and tertiary amines having bound to the nitrogen atom methyl groups substituted by a radical selected from the group consisting of radicals of aliphatic hydrocarbons containing not less than 2 carbon atoms and not more than 7 carbon atoms, and aromatic radicals of the benzene series.

6. A stabilized silver halide emulsion containing tri-normal-amylamine.

7. A stabilized silver halide emulsion containing di-iso-amylamine.

8. A stabilized silver halide emulsion containing di-benzylamine.

GUSTAV WILMANNS.
JOHANNES BRUNKEN.